United States Patent [19]

Graf et al.

[11] 3,718,851
[45] Feb. 27, 1973

[54] MEANS RESPONSIVE TO AN OVERVOLTAGE CONDITION FOR GENERATING A FREQUENCY INCREASING CONTROL SIGNAL

[75] Inventors: Carlton Eugene Graf; Einar Aasen Skogsholm, both of Erie, Pa.

[73] Assignee: General Electric Company

[22] Filed: Aug. 16, 1971

[21] Appl. No.: 172,113

[52] U.S. Cl. .................... 321/12, 318/227, 318/230, 321/5, 321/4
[51] Int. Cl. ............. H02m 7/52, H02m 1/18, H02p
[58] Field of Search .......... 321/4, 5, 12, 11, 18, 45 C; 318/227, 230, 231

[56] References Cited

UNITED STATES PATENTS 3,670,224  6/1972  Jensen ........................... 318/230 X
3,683,264  8/1972  Schieman ......................... 321/45 C
3,394,297  7/1968  Risberg .......................... 318/227
3,593,103  7/1971  Chandler ........................ 318/227 X
3,403,318  9/1968  Krauthamer et al. .................. 321/5
3,628,126  12/1971  Kawakami et al. ................. 321/45 C
3,551,632  12/1970  Geisel ............................ 321/4

Primary Examiner—William H. Beha, Jr.
Attorney—James C. Davis, Jr. et al.

[57] ABSTRACT

The d-c voltage of reversible d-c to a-c power conversion apparatus is continuously sensed and utilized to produce an overvoltage signal when and only when the d-c voltage is equal to or greater than a pre-determined level. The overvoltage signal is transmitted to the control means for the power conversion apparatus as a control signal, the magnitude and polarity of the overvoltage signal being such that the operating frequency of power conversion means is increased.

11 Claims, 2 Drawing Figures

MEANS RESPONSIVE TO AN OVERVOLTAGE CONDITION FOR GENERATING A FREQUENCY INCREASING CONTROL SIGNAL

BACKGROUND OF THE INVENTION

1. Field of the Invention

This invention relates to protection means for power conversion apparatus for a-c adjustable speed drive systems in which speed is controlled through adjustment of the operating frequency of the power conversion apparatus and, more particularly, to means for generating a frequency increasing control signal whenever the operating voltage exceeds a predetermined level.

2. Description of the Prior Art

This invention is particularly applicable to the protection of inverter power conversion circuits in drive systems of the general type disclosed and claimed by copending patent application Ser. No. 81,758, entitled "Adjustable Speed Polyphase A-C Motor Drive," filed on Oct. 19, 1970, in the names of Carlton E. Graf and Werner K. Volkmann, and by copending patent application Ser. No. 81,757, entitled "Synchronous Time Ratio Control Power Regulator," filed on Oct. 19, 1970, in the name of Carlton E. Graf, both applications being assigned to the assignee of this invention. While the present invention will be described herein in connection with a drive system of the type taught by the aforesaid patent applications to the extent necessary for a full and complete understanding of the invention, a more complete understanding of such inverter circuits may be obtained from the aforesaid patent applications and U.S. Pat. No. 3,207,974 to McMurray, also assigned to the assignee of this invention.

In inverter power conversion circuits of the type taught by the aforesaid references, the apparatus for changing d-c electric power to adjustable frequency a-c electric power, and for changing a-c power to d-c power during operation in a regenerative mode, includes a number of series circuits connected in parallel across a d-c source. Each of the series circuits includes a pair of thyristor devices, or gate-controlled rectifiers, such as silicon controlled rectifiers. As will become apparent as this description proceeds, these thyristors are "fired" or turned "on" and commutated "off" by suitable control apparatus in a prescribed sequence and at a selected rate so as to produce the desired power conversion at the desired frequency. It is highly desirable that the d-c voltage existing during operation of the power conversion apparatus be maintained within a pre-established range having upper and lower limits. More particularly, the voltage should be maintained at all times below the level at which individual inverter components, including the thyristors, commutating capacitors, and the like, are subjected to excessive and potentially destructive voltages. Similarly, the d-c voltage should be maintained at a level high enough to assure proper commutation of the thyristors. If the voltage were to drop to a level insufficient to support commutation, the result would be simultaneous conduction of both thyristors in a single series circuit. This "shoot-through" would result in turn in a rapidly rising current and possible damage to the inverter components. It is, therefore, highly desirable that the d-c voltage level be continuously monitored in inverter power systems and that appropriate action be taken automatically to protect against the potentially adverse effects of overvoltage and undervoltage operation.

By a patent application filed concurrently herewith, entitled "Protection Means For Preventing Overvoltage And Undervoltage Conditions In Power Circuits," Ser. No. 172,122 filed on the names of Carlton E. Graf and Einar A. Skogsholm and assigned to the assignee of this invention, improved apparatus is provided for continuously monitoring voltage in a power conversion system and automatically stopping operation of the apparatus in the event of an overvoltage or undervoltage condition. It is, of course, undesirable that operation be stopped unless absolutely essential for the protection of circuit elements. It is, therefore, desirable that the acceptable voltage range be made as large as practicable so that operation will not be unnecessarily stopped. Experience has taught that overvoltage conditions are most likely to occur during operation in the regenerative mode in which electric power is being returned from a motor through the power conversion apparatus to the d-c source. It has been known heretofore that the voltage on critical circuit components, including the thyristors, can be reduced significantly during regeneration by increasing the operating frequency of the inverter so as to cause the motor to return power to the d-c source at a slower rate. By making such an adjustment in operating frequency it is often possible to prevent the d-c voltage from reaching the voltage limit at which operation should be stopped.

Various approaches have heretofore been suggested for sensing inverter voltage during regeneration and increasing the operating frequency at a pre-determined voltage level. For example, in the aforesaid patent application Ser. No. 81,758, it is suggested that the d-c voltage of the inverter be sensed and compared with the d-c source voltage and that the operating frequency be adjusted when the inverter voltage is a pre-selected amount greater than the source voltage. While such an approach is entirely satisfactory and desirable for many applications, particularly those in which the source voltage is subject to substantial variation, it requires relatively complex and expensive comparison circuitry.

SUMMARY OF THE INVENTION

It is, therefore, an object of this invention to provide improved means for protecting thyristors and other power circuit elements against potentially destructive conditions resulting from overvoltage operation during operation in the regenerative mode.

Another object of this invention is to provide means for automatically protecting thyristors and other circuit elements against potentially destructive conditions resulting from overvoltage operation without stopping power system operation.

Another object is to provide means for detecting overvoltage in an inverter circuit and automatically increasing the frequency of operation so as to reduce component voltages.

A further object of this invention is to provide means for providing the foregoing objects without requiring the use of voltage comparison circuitry.

A still further object is to provide protective means in accordance with the foregoing objects which is relatively simple, reliable, and inexpensive.

Briefly stated, in carrying out the invention in one form, an electrical system includes static d-c to a-c power conversion means for reversibly transmitting electric power between a d-c source and a load adapted for a-c operation. The electrical system also includes control means for controlling the frequency of operation of the power conversion apparatus in response to control signals supplied thereto. In accordance with the invention, a control signal generation means is provided, the control signal generation means including a voltage signal generator coupled to the electrical system for generating a continuous electrical signal proportional at all times to the d-c voltage at the power conversion means. An overvoltage signal generator is coupled to the voltage signal generator for receiving the voltage signal and generating an overvoltage signal when and only when the voltage signal is equal to or greater than a predetermined level. The overvoltage signal is supplied to the control means as a control signal and has a magnitude and polarity adapted to cause the control means to increase the frequency of operation.

By a further aspect of the invention, the overvoltage signal generator includes means responsive to the continuous voltage signal for producing a first signal having a fixed level when the voltage signal is less than the predetermined level and a second signal having a different fixed level when the voltage signal is equal to or greater than the predetermined level. The overvoltage signal generator further includes selective transmission means for blocking transmission of the first signal to the control means and for permitting transmission of the second signal to the control means as the overvoltage signal.

BRIEF DESCRIPTION OF THE DRAWINGS

While the novel features of this invention are set forth with particularity in the appended claims, the invention, both as to organization and content, will be better understood and appreciated, along with other objects and features thereof, from the following detailed description taken in conjunction with the drawings, in which:

DETAILED DESCRIPTION

Figure 1:
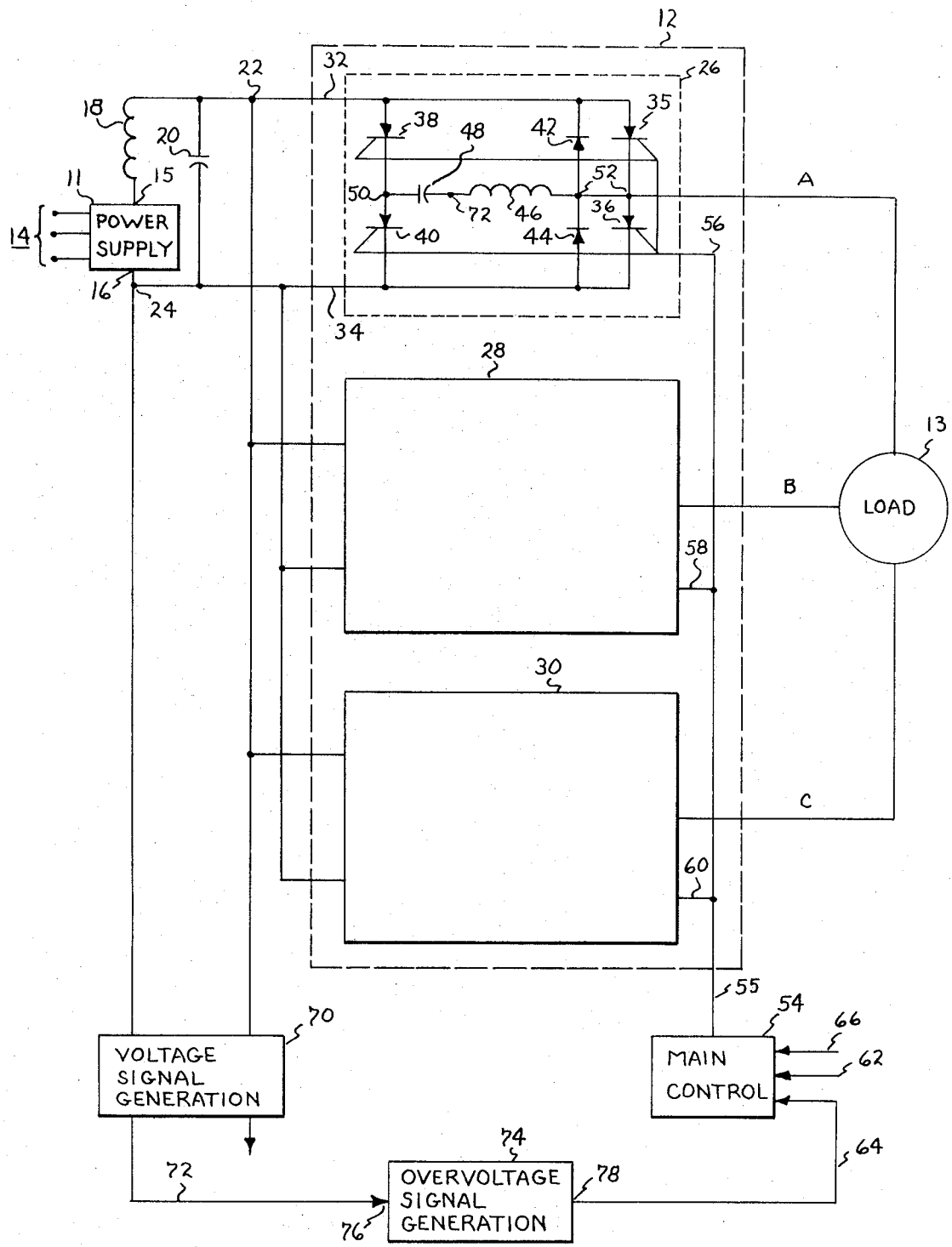
FIG. 1 is a block diagram of an a-c drive system including voltage responsive protection means in accordance with the present invention.

The a-c drive system shown in FIG. 1, in block diagram form, includes a d-c power supply 11, power conversion apparatus 12, and a load 13 which is preferably an a-c polyphase motor. The d-c power supply 11 is typically energized from a commercially available source 14 of three-phase alternating current electric potential, and therefore, provides during motoring operation a pulsating d-c potential between its output terminals 15 and 16 that is filtered or smoothed by a suitable filter network including a filter inductor 18 and a shunt connected filter capacitor 20. Accordingly, relatively smooth d-c potential is supplied to the input terminals 22 and 24 of the power conversion apparatus when electric power is being supplied thereto from the source 11. It will, of course, be readily apparent that the source 11 could be a battery or other source of d-c potential. The purpose of the power conversion apparatus 12 is to convert the electric power supplied thereto into another form, a d-c to a-c transformation during operation in the motoring mode and an a-c to d-c transformation during regeneration.

As indicated, the load 13 is preferably a three-phase motor supplied with variable frequency, variable voltage electric power from the power conversion apparatus 12 over phase conductors A, B and C. The power conversion apparatus 12 includes an inverter circuit for each phase A, B and C, the inverter circuits, respectively, being indicated by the reference numerals 26, 28 and 30. The inverter circuit 26 for Phase A includes a positive bus 32 connected to the electrical junction 22 between the inductor 18 and the capacitor 20 and a negative bus 34 connected to the negative terminals 24 and 16. The inverter circuit 26 includes a pair of load current gate controlled rectifiers 35 and 36 connected in series between the positive bus 32 and the negative bus 34 with the anode of rectifier 35 connected to the positive bus 32. Gate controlled rectifiers 38 and 40 are also connected in series between the buses 32 and 34 with the same polarity as the gate controlled rectifiers 35 and 36. The gate controlled rectifiers or thyristors 35, 36, 38 and 40 are preferably silicon controlled rectifiers, but it will be obvious that functionally equivalent devices such as gaseous thyratrons can be used. Diode rectifiers 42 and 44 are connected to parallel the controlled rectifiers 35 and 36, respectively, in reverse polarity, and an inductor 46 and a capacitor 48 are connected in series between the junction 50 of the gate controlled rectifiers 38 and 40 and the junction 52 of the gate controlled rectifiers 35 and 36 and the diode rectifiers 42 and 44. Phase A of the induction motor 13 is connected to the junction 52 for receiving alternating current from the inverter circuit 26. Inverter circuits 28 and 30 for supplying alternating current to Phases B and C, respectively, are identical to the inverter circuit 26 in physical structure and mode of connection to the d-c source 11 and the load 13.

As illustrated by FIG. 1, main control apparatus 54 is provided for turning on the gate controlled rectifiers 35, 36, 38 and 40 of the inverter circuit of Phase A by means of firing signal pulses supplied through connections 55 and 56. Similar signal pulses are also supplied through connections 58 and 60 to the gate controlled rectifiers of the circuits 28 and 30. The main control apparatus 54 is responsive to various input signals including a primary reference signal 62 and an overvoltage signal generated in accordance with this invention and supplied to the main control apparatus on conductor 64. Other control signals may also be supplied to the main control apparatus 54 as represented by the input 66 thereto. There, other control signals, along with the overvoltage signal of the present invention and the primary reference signal 62, determine the frequency and voltage of the electric power supplied to the load 13. For a detailed description of the manner by which the main control approaches 54 controls the operation of the power conversion apparatus 12, attention is directed to the aforesaid patent applications and the said McMurray patent.

Before turning attention to the voltage responsive protection apparatus of this invention, the general mode of operation of the drive system of FIG. 1 will be described briefly. It should be borne in mind that the basic function of the inverter circuits 26, 28 and 30 is to reversibly transform d-c power from the source 11 to a-c power for delivery through Phases A, B and C to the motor 13. To accomplish this in Phase A, the gate controlled rectifiers 35 and 36 of circuit 26 conduct alternately for time periods established by the main control apparatus 54. The fundamental frequency at which changes in conduction occur is controlled by the main control apparatus 54 and firing signal pulses which it causes to be supplied to the gate controlled rectifiers of the circuit 26. The manner in which conduction is varied is known as commutation and now will be described briefly with respect to Phase A and the inverter circuit 26.

Initially, let it be assumed that the main controlled rectifier 35 is conducting current to the motor 13. As a result of previous operation, the capacitor 48 is charged such that a point 72 between the capacitor 48 and the inductor 46 is positive in potential with respect to the junction 50. To commutate the controlled rectifier 35 "off," the commutating controlled rectifier 38 is turned "on," as by receiving a firing signal pulse from the control apparatus 54 through connection 56. A series oscillatory circuit comprising the commutating capacitor 48 and the commutating inductor 46 is now connected across the load current carrying controlled rectifier 35. A current pulse produced by the discharging series oscillatory circuit takes over the function of supplying load current to the motor 13 and causes the diode 42 to be forward biased. As a result, the current through the controlled rectifier 35 is reduced to zero. The feedback diode 42 conducts excess commutation current around the controlled rectifier 35 and provides a limited reverse bias across the controlled rectifier 35. This reverse bias lasts for a period greater than the turn-off time of the controlled rectifier 35 so that this controlled rectifier is caused to turn "off," i.e., to regain its blocking mode of operation.

After the commutating capacitor 48 has been charged to the opposite polarity, so that the junction 50 is more positive in potential than the positive bus 32, the commutating controlled rectifier 38 turns off. Since the controlled rectifier 35 is now turned off, reactive current circulates through the opposite feedback diode 44. The main controlled rectifier 36 can be fired at this time by applying a firing signal to its gate electrode through connection 56. The commutating capacitor 48 thereafter has the appropriate polarity to commutate "off" this controlled rectifier when the commutating controlled rectifier 40 is turned on. After the controlled rectifiers 36 and 40 are turned "off" to complete a full cycle of 360 electrical degrees, the capacitor 48 is charged to the same polarity as it was at the start of the commutation interval. As indicated above, this general type of control and commutation of inverter circuits is disclosed in greater detail by the said McMurray patent.

It will, of course, readily occur to those skilled in the art that the conduction of the gate controlled rectifiers of inverter circuits 28 and 30 are controlled in the same manner by firing signal pulses supplied thereto from the firing circuitry 54 over the connections 58 and 60. The alternating current thus supplied to Phases B and C by the inverter circuits 28 and 30, respectively, has the same frequency as the alternating current electric power supplied to Phase A, but the wave forms supplied to the three phases are displaced from one another in time by 120 electrical degrees as is customary in three-phase systems. In addition to controlling the fundamental frequency at which the alternating current power is supplied to the motor 13, the control apparatus 54 preferably includes means as taught by the aforesaid copending patent applications to control the average voltage by means of time-ratio-controlled switching of the gate controlled rectifiers of the circuits 26, 28 and 30.

During regenerative operations of the motor 13, that is when the motor 13 is returning a-c electric power to the power conversion apparatus 12 from which the electric power is returned in d-c form to the power supply 11, the returning power tends to charge the filter capacitor 20. If the power supply 11 is not capable of inverting the d-c power back into the a-c supply 14, the voltage across the capacitor 20 may build up to a level sufficient to cause failure of some circuit components, including the controlled rectifiers of the inverter circuits, unless appropriate steps are taken to protect the threatened circuit elements. In accordance with the invention of copending U.S. Pat. application Ser. No. 172,122, means are provided for sensing the voltage across the capacitor 20 and automatically stopping the operation of the power system when the voltage reaches a critical limit. It is, of course, preferable that this voltage limit be set as high as possible so that operation will not be unnecessarily curtailed. It has been found that the voltage can often be prevented from reaching this high level if a preliminary frequency adjustment is made at an intermediate voltage level. More particularly, it has been found that the voltage across the controlled rectifiers and certain other elements of the inverter circuits can be reduced by increasing the frequency of operation (the frequency of the a-c power transmitted between the motor 13 and the power conversion equipment 12).

Still referring to FIG. 1, the control apparatus of this invention will now be described. The d-c input junctions 22 and 24 to the power conversion apparatus 12 are connected to a voltage signal generator 70, which continuously monitors the voltage across the junctions 22 and 24 and the capacitor 20 and produces on an output conductor 72 a continuous positive electric signal proportional at all times to the voltage across the junctions 22 and 24. Various well-known devices, such as voltage dividers, may be utilized to produce the proportional signal supplied to the conductor 72. An overvoltage signal generator 74 has an input 76 connected to the conductor 72 to receive the continuous voltage signal therefrom, the overvoltage signal generator 74 producing at an output 78 an overvoltage signal when and only when the voltage across the junctions 22 and 24 exceeds a pre-established level as represented by a pre-determined magnitude of the voltage signal on conductor 72. The pre-established level of voltage to which the overvoltage signal generator 74 is responsive is the intermediate voltage level at which it is desired to increase the frequency of operation so as to protect inverter components. As a practical matter, to avoid unnecessary frequency changes resulting from small voltage fluctuations which do not significantly endanger circuit components, the voltage level is ordinarily selected at at least 110 percent of the normal voltage of the d-c source 11. Conductor 64 is connected to output 78 for conducting the overvoltage signal to the main control apparatus as a control signal having a magnitude and polarity for causing the control means to increase the operating frequency.

Figure 2:
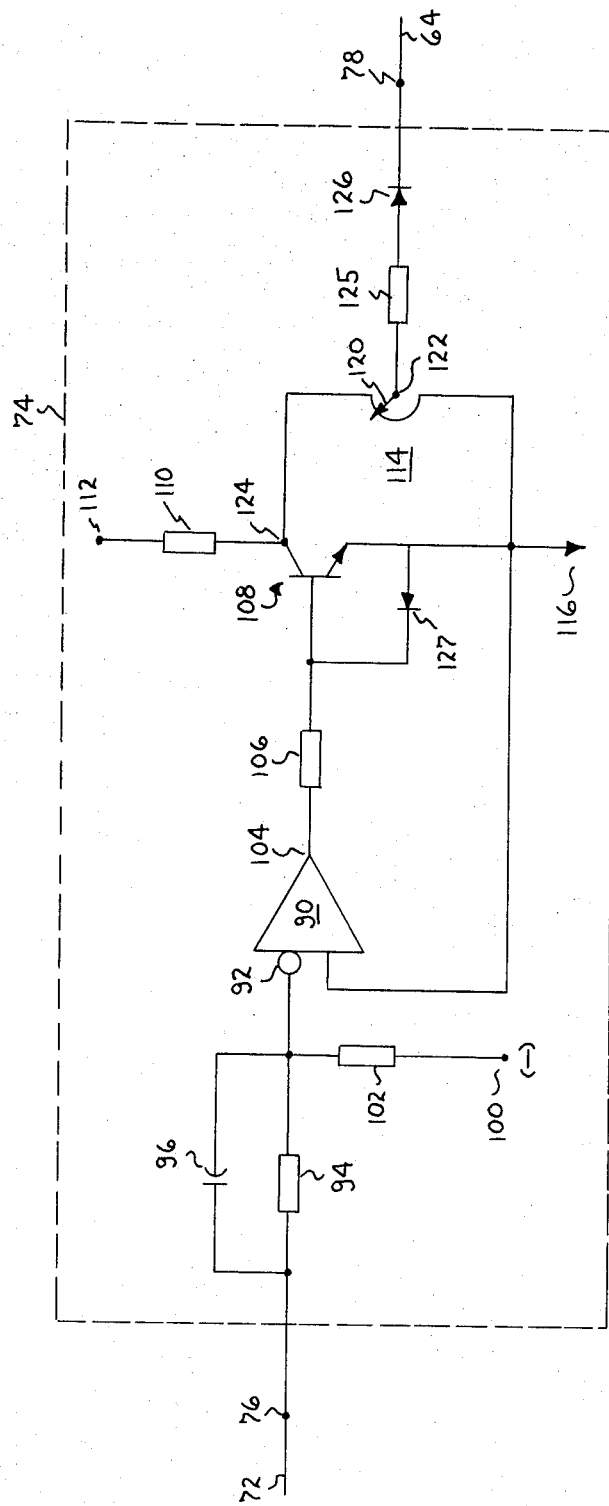
FIG. 2 is a circuit diagram of the overvoltage signal generation means of FIG. 1.

Referring now to FIG. 2, the overvoltage signal generator 74 will be described in detail. The generator 74 includes an amplifier 90 having an inverting input 92 coupled to the generator input 76 through a lead circuit comprising a resistor 94 and a capacitor 96 connected in parallel. The inverting input 92 is also connected to a source 100 of negative d-c potential through a resistor 102. A non-inverting input 91 is connected to a common point 116. The output 104 of the amplifier 90 is connected through a resistor 106 to the base of a transistor 108 of the NPN type. The collector of the transistor 108 is connected through junction 124 and a resistor 110 to a source 112 of positive d-c potential, and the collector of the transistor 108 is also connected through a voltage divider 114 to the common point 116. By means of a slide wire 120, the voltage at junction 122 can be adjusted, when the transistor 108 is in its non-conductive state, between essentially the voltage of junction 124 and the voltage of the common point 116. The junction 122 is connected through a resistor 125 and a diode rectifier 126 to the output 78 and conductor 64, the diode 126 being pole such that the application thereto of a positive voltage which is greater than the minimum forward voltage of the diode 126, typically on the order of 0.5 volts for silicon diodes, will result in a positive signal at junction 78. The application to the diode 126 of a positive voltage of less than the minimum forward voltage of the diode 126 or the application of a negative voltage will not result in a signal at output 78 since the diode 126 will block the transmission of the signal.

Let it now be assumed that the electrical system illustrated by FIG. 1 is operating in the regenerative mode, that is with the motor 13 supplying a-c power to the power conversion apparatus 12, and the power conversion apparatus 12 returning the power in d-c form to the source 11. Let it also be assumed that the voltage signal generator 70 is constructed such that its output is always positive and always proportional to the d-c voltage across the filter capacitor. With reference to FIG. 2, resistors 94 and 102 and the voltage of the negative d-c source 100 are selected such that the signal supplied to the inverting input 92 of amplifier 90 has a negative polarity when the voltage across the filter capacitor 20 is less than the pre-established level and a positive polarity when the voltage is equal to or greater than the pre-established level. When the input signal to input 92 is negative, a positive signal having a magnitude sufficient to turn on the transistor 108 is supplied to the base of the transistor 108 through the resistor 106. With the transistor 108 turned on, the voltages at junctions 124 and 122 have fixed levels substantially equal to that of the common point 116 since the transistor 108 has a very small voltage drop relative to that of the resistor 110. The fixed voltage at junction 122 may be viewed as a first signal having a fixed level independent of the magnitude of the voltage signal on conductor 72 so long as the voltage signal on 72 is less than that corresponding to the pre-established voltage level across the filter capacitor. Stated differently, since the signal on 72 is proportional to the voltage across capacitor 20, it may be said that the first signal is produced so long as the continuous voltage signal on conductor 72 is less than a pre-determined level.

When, however, the continuous voltage signal on conductor 72 increases to the pre-determined level, the signal at input 92 of the amplifier 90 becomes positive, and the output signal at 104 becomes negative. The switch at output 104 from a substantial positive signal to a substantial negative signal turns off the transistor 108. When the transistor 108 is in its off, or non-conductive state, the voltage drop from the positive terminal 112 to the common point 116 is taken across resistor 110 and voltage divider 114. Since the total voltage drop is constant and the total resistance of the resistor 106 and the voltage divider 114 is also constant, the voltage at junction 122 will have a fixed level intermediate the voltage at junction 124 and the common point 116. By selective movement of the slidewire 120, however, the fixed level at junction 122 can be varied between a high fixed level substantial equal to the voltage of junction 124 and a lower fixed level. The fixed voltage at junction 122 when the transistor 108 is in its non-conductive state may be viewed as a second signal. The second signal is produced when and only when the continuous voltage signal on conductor 72 is equal to or greater than the pre-determined level. It will be obvious that the magnitude of the second signal is also independent of the magnitude of the voltage signal on conductor 72.

Referring now to FIGS. 1 and 2, the operation of the control apparatus of this invention will now be described. Assuming operation in the regenerative mode, and a voltage across the filter capacitor 20 of less than about 110 percent of the normal voltage of the source 11, the magnitude of the continuous voltage signal on conductor 72 will be such that the transistor 108 is in its conductive state. The first signal will be produced at junction 122, and the positive magnitude of this signal as modified by the resistor 125 will be less than the minimum forward voltage of the diode 126 and the diode 126 will therefore block the transmission of any signal over conductor 64 to the main control apparatus 54. Accordingly, when the voltage across the junctions 22 and 24 is less than a pre-established level of about 110 percent of the normal source voltage, the control apparatus of this invention will have no effect on the operation of the main control apparatus 54 and the power conversion means 12.

When, however, the voltage across the capacitor 20 reaches or exceeds the pre-established level, the magnitude of the continuous voltage signals on conductor 72 will be such that transistor 108 switches to its non-conductive state to produce the second signal at junction 122. The second signal has a magnitude sufficient to cause conduction through the diode 126 to the main control apparatus 54. This fixed signal causes an appropriate increase in the frequency of operation of the inverter circuits 26, 28 and 30 so as to protect circuit components therein. The amount of adjustment may be varied by adjusting the position of the slidewire on the voltage divider 114 so as to vary the fixed magnitude of the second, or overvoltage, signal. As described, a positive signal on conductor 64 causes an increase in frequency. Inverting apparatus can be included if the main control apparatus 54 requires a negative input for an increase in operating frequency.

It will occur to those skilled in the art that the control apparatus of this invention will also cause a frequency increase during operation in the motoring mode if the voltage across the capacitor 20 is equal to or greater than the pre-established level. As a practical matter, such a variation from the normal voltage during motoring operation is highly unlikely when the source 11 receives its power from a commercial source such as utility lines. If, however, variations in source voltage can reasonably be expected, it may be desirable to utilize some sort of comparison circuitry as described in the aforesaid patent application Ser. No. 81,758 in conjunction with the overvoltage signal generator 74.

It will also be obvious to those skilled in the art that the various elements comprising the overvoltage signal generator 74 of FIG. 2 must be selected properly in order to provide operation as just described. In one embodiment of the invention, a power supply providing +20 volts at terminal 112, 0 volts at common point 116, and −5 volts at terminal 100 was provided. The transistor 108 was a JEDEC No. 2N4424, the amplifier 90 was a uA741, and the diode rectifiers 126 and 127 were No. 1N4148. The capacitor 96 had a value of 10mf and the resistors 94, 102, 106, 110 and 125 had resistances of 15K, 5.6K, 10K, 8.2K, and 470K, respectively. The voltage divider was 10K. As a result, the fixed level of the second signal could range from 0 volts to 8 volts depending upon the amount of frequency adjustment desired. Various other approaches within the scope of this invention will readily occur to those skilled in the art. For example, various changes in the circuitry of FIG. 2 would be necessary if the signal on conductor 72 were always negative rather than positive or if the signal were to change polarity when the voltage across the filter capacitor 20 (FIG. 1) reaches the pre-established level.

In summary, the present invention provides means for detecting overvoltage in an inverter circuit and automatically increasing the frequency of operation so as to reduce voltage levels on circuit components.

While the invention has been particularly shown and described with reference to a preferred embodiment thereof, it will be understood by those skilled in the art that various changes in form, details, and application may be made therein without departing from the spirit and scope of the invention. Accordingly, it is intended that these and other modifications of the invention be included within the scope of the appended claims.

What is claimed as new and is desired to secure by Letters Patent of the United States is:

1. In an electrical system including static d-c to a-c power conversion means for reversibly transmitting electric power between a d-c source and a load and control means coupled to and controlling the operation of the power conversion means such that the frequency of a-c power transmitted between the power conversion means and the load is adjusted in response to control signals supplied to the control means, control signal generation means comprising:

voltage signal generation means coupled to the electrical system for sensing the d-c voltage at the power conversion means and being responsive thereto to generate a continuous electrical signal proportional to the d-c voltage, and overvoltage signal generation means coupled to said voltage signal generation means and the control means for receiving the continuous voltage signal from said voltage signal generation means and for supplying an overvoltage signal to the control means as a control signal, said overvoltage signal generation means comprising:

means responsive to the continuous voltage signal to produce a first signal having a fixed level when the voltage signal is less than a pre-determined overvoltage level and a second signal having a fixed level when the voltage signal is equal to or greater than the pre-determined overvoltage level, and transmission means for blocking transmission of the first signal to the control means and for transmitting the second signal to the control means as the overvoltage signal, the overvoltage signal having a magnitude and polarity adapted to cause the control means to increase the frequency of the a-c power transmitted between the power conversion means and the load, whereby said overvoltage signal generation means is responsive to the continuous voltage signal such that an overvoltage signal is generated when and only when the voltage signal is equal to or greater than the pre-determined overvoltage level.

2. Control signal generation means as defined by claim 1 in which said blocking means is a rectifier.

3. In an electrical system including static d-c to a-c power conversion means for reversibly transmitting electric power between a d-c source and a load and control means coupled to and controlling the operation of the power conversion means such that the frequency of a-c power transmitted between the power conversion means and the load is adjusted in response to control signals supplied to the control means, control signal generation means comprising:

voltage signal generation means coupled to the electrical system for sensing the d-c voltage at the power conversion means and being responsive thereto to generate a continuous electrical signal proportional to the d-c voltage, and overvoltage signal generation means coupled to said voltage signal generation means and the control means for receiving the continuous voltage signal from said voltage signal generation means and for supplying an overvoltage signal to the control means as a control signal, said overvoltage signal generation means comprising:

means responsive to the continuous voltage signal to produce a first signal having a fixed level when the voltage signal is less than a pre-determined overvoltage level and a second signal having a fixed level when the voltage signal is equal to or greater than the pre-determined overvoltage level, said means for producing the first and second signals having a snap action electrical device such that the fixed levels of said first and second signals differ substantially from each other, and selective transmission means for blocking transmission of the first signal to the control means and for permitting transmission of the second signal to the control means as the overvoltage signal, the overvoltage signal having a magnitude and polarity adapted to cause the control means to increase the frequency of the a-c power transmitted between the power conversion means and the load, whereby said overvoltage signal generation means is responsive to the continuous voltage signal such that an overvoltage signal is generated when and only when the voltage signal is equal to or greater than the pre-determined overvoltage level.

4. Control signal generation means as defined by claim 3 further comprising means for selectively adjusting the fixed level of the second signal.

5. Control signal generation means as defined by claim 4 in which said selective transmission means includes a rectifier for blocking transmission of the first signal to the control means.

6. Control signal generation means as defined by claim 5 in which the predetermined overvoltage level is at least 110 percent of the normal voltage of said d-c source, and in which filter means are interposed between said d-c source and said power conversion means.

7. Control signal generation means as defined by claim 3 in which said means for producing the first and second signals includes resistive circuit means connected across a source of electric potential, said resistive circuit means including switching means having conductive and non-conductive states, the first signal being generated when said switching means is in a first one of its states and the second signal being generated when said switching means is in a second one of its states.

8. Control signal generation means as defined by claim 7 in which said means for producing the first and second signals further comprises amplification means responsive to the continuous voltage signal for shifting said switching means between its conductive and non-conductive states.

9. Control signal generation means as defined by claim 7 further comprising means for selectively adjusting the fixed level of the second signal.

10. Control signal generation means as defined by claim 9 in which said selective transmission means includes a rectifier for blocking transmission of the first signal to the control means.

11. Control signal generation means as defined by claim 10 in which the pre-determined overvoltage level is at least 110 percent of the normal voltage of said d-c source, and in which filter means are interposed between said d-c source and said power conversion means.

* * * * *